(12) United States Patent
Gheorghiu et al.

(10) Patent No.: US 11,330,534 B2
(45) Date of Patent: May 10, 2022

(54) USER EQUIPMENT REPORTING FOR MAXIMUM PERMISSIBLE EXPOSURE MITIGATION

(71) Applicant: QUALCOMM Incorporated, San Diego, CA (US)

(72) Inventors: Valentin Alexandru Gheorghiu, Yokohama (JP); Raghu Narayan Challa, San Diego, CA (US); Timo Ville Vintola, San Diego, CA (US); Tienyow Liu, Santa Clara, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,574

(22) Filed: Nov. 4, 2020

(65) Prior Publication Data

US 2021/0144652 A1 May 13, 2021

Related U.S. Application Data

(60) Provisional application No. 62/933,089, filed on Nov. 8, 2019.

(51) Int. Cl.
*H04W 52/34* (2009.01)
*H04W 52/36* (2009.01)

(52) U.S. Cl.
CPC ......... *H04W 52/34* (2013.01); *H04W 52/365* (2013.01); *H04W 52/367* (2013.01)

(58) Field of Classification Search
CPC .. H04W 52/365; H04W 52/367; H04W 52/34

USPC ................. 455/522, 69, 509, 452.1
See application file for complete search history.

(56) References Cited

U.S. PATENT DOCUMENTS

| 2015/0181618 | A1* | 6/2015 | Yang | H04L 69/03 370/329 |
| 2020/0112927 | A1* | 4/2020 | Han | H04W 52/367 |
| 2020/0383067 | A1* | 12/2020 | Liu | H04W 52/365 |

OTHER PUBLICATIONS

Intel Corporation: "Solution enhancements to mitigate link failures in FR2", 3GPP Draft: R4-1912287—Solution Enhancements to Mitigate Link Failures in FR2, 3RD Generation Partnership Project (3GPP) (Year: 2019).*

(Continued)

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, a user equipment (UE) may transmit, and a base station may receive, a report that includes information related to a power headroom available to the UE at a current power level and information related to a duty cycle that the UE can sustain over a moving integration window based at least in part on a maximum permissible exposure limit. In some aspects, the base station may transmit, and the UE may receive, scheduling information based at least in part on the information related to the power headroom available to the UE at the current power level and the information related to the duty cycle that the UE can sustain over the moving integration window. Numerous other aspects are provided.

30 Claims, 6 Drawing Sheets

(56) References Cited

OTHER PUBLICATIONS

"3rd Generation Partnership Project, Technical Specification Group Radio Access Network, NR, Physical Layer Procedures for Control (Release 15)", 3GPP Standard, Technical Specification, 3GPP TS 38.213. 3rd Generation Partnership Project (3GPP), Mobile Competence Centre, 650, Route Des Lucioles, F-06921 Sophia-Antipolis Cedex, France, vol. RAN WG1. No. V15.7.0, Sep. 28, 2019 (Sep. 28, 2019), pp. 1-108, XP051785089, Retrieved from the Internet: URL: ftp://ftp.3gpp.org/Specs/archive/38_series/38.213/38213-f70.zip. 38213-f70.docx [retrieved on Sep. 28, 2019] section 7 .1.1 section 7.7.1.

"3rd Generation Partnership Project, Technical Specification Group Radio Access Network, NR, User Equipment (UE) Radio Transmission and Reception, Part 2: Range 2 Standalone (Release 16)", 3GPP Standard, Technical Specification, 3GPP TS 38.101-2, 3rd Generation Partnership Project (3GPP), Mobile Competence Centre, 650, Route Des Lucioles, F-06921 Sophia-Antipolis Cedex, France, vol. RAN WG4. No. V16.1.0, Oct. 7, 2019 (Oct. 7, 2019), pp. 1-152, XP051785362, Retrieved from the Internet: URL: ftp://ftp.3gpp.org/Specs/archive/38_series/38.101-2/38101-2-g10.zip. 38101-2-g10.docx. [retrieved on Oct. 7, 2019] section 6.2.4.

Interdigital Inc: "Pre-Emptive Approach for MPE and SAR Issues Mitigation", 3GPP Draft, TSG-RAN Working Group 4 (Radio) #92bis, R4-1911208, Pre-Emptive Approach for MPE and SAR Issues Mitigation, 3rd Generation Partnership Project (3GPP). Mobile Competence Centre; 650. Route Des Lucioles ; F-06921 Sophia-Anti Polis vol. TSG RAN. No. Chongqing. CN, Oct. 14, 2019-Oct. 18, 2019, Oct. 4, 2019 (Oct. 4, 2019), XP051806025, 4 pages, Retrieved from the Internet: URL: https://ftp.3gpp.org/tsg_ran/WG4_Radio/TSGR4_92Bis/Docs/R4-1911208.zip. R4-1911208 Preemptive approach for MPE and SAR issues mitigation.docx [retrieved on Oct. 4, 2019] p. 2. line 3-line 31.

International Search Report and Written Opinion—PCT/US2020/070751—ISA/EPO—dated Feb. 12, 2021.

Qualcomm Incorporated: "MaxULDutycycle and ETC FR2 AH minutes", 3GPP Draft, R4-1904991, FR2 MAXUplinkDutyCycle and ETC AH Minutes V2, 3rd Generation Partnership Project (3GPP), Mobile Competence Centre, 650, Route Des Lucioles, F-06921 Sophia-Antipolis Cedex, FR vol. RAN WG4. No. Xian, China, Apr. 8, 2019-Apr. 12, 2019, Apr. 15, 2019 (Apr. 15, 2019), XP051715277, 4 Pages, Retrieved from the Internet: URL: http://www.3gpp.org/ftp/tsg%5Fran/WG4%5FRadio/TSGR4%5F90Bis/Docs/R4%2D1904991%2Ezip. [retrieved on Apr. 15, 2019] section 2.2.

* cited by examiner

USER EQUIPMENT REPORTING FOR MAXIMUM PERMISSIBLE EXPOSURE MITIGATION

CROSS-REFERENCE TO RELATED APPLICATION

This Patent Application claims priority to U.S. Provisional Patent Application No. 62/933,089, filed on Nov. 8, 2019, entitled "USER EQUIPMENT REPORTING FOR MAXIMUM PERMISSIBLE EXPOSURE MITIGATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment reporting for maximum permissible exposure mitigation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: transmitting, to a base station, a report that includes information related to a power headroom at a current power level and information related to a sustainable duty cycle over a moving integration window based at least in part on a maximum permissible exposure (MPE) limit; and receiving, from the base station, scheduling information based at least in part on the information related to the power headroom at the current power level and the information related to the sustainable duty cycle over the moving integration window.

In some aspects, a method of wireless communication, performed by a base station, may include: receiving, from a UE, a report that includes information related to a power headroom at the UE and information related to a sustainable duty cycle for the UE over a moving integration window based at least in part on an MPE limit; and transmitting, to the UE, scheduling information based at least in part on the information related to the power headroom at the UE and the information related to the sustainable duty cycle for the UE over the moving integration window.

In some aspects, a UE for wireless communication may include a memory and one or more processors operatively coupled to the memory. The memory and the one or more processors may be configured to: transmit, to a base station, a report that includes information related to a power headroom at a current power level and information related to a sustainable duty cycle over a moving integration window based at least in part on an MPE limit; and receive, from the base station, scheduling information based at least in part on the information related to the power headroom at the current power level and the information related to the sustainable duty cycle over the moving integration window.

In some aspects, a base station for wireless communication may include a memory and one or more processors operatively coupled to the memory. The memory and the one or more processors may be configured to: receive, from a UE, a report that includes information related to a power headroom at the UE and information related to a sustainable duty cycle for the UE over a moving integration window based at least in part on an MPE limit; and transmit, to the UE, scheduling information based at least in part on the information related to the power headroom at the UE and the information related to the sustainable duty cycle for the UE over the moving integration window.

In some aspects, a non-transitory computer-readable medium may store one or more instructions for wireless communication. The one or more instructions, when executed by one or more processors of a UE, may cause the one or more processors to: transmit, to a base station, a report that includes information related to a power headroom at a current power level and information related to a sustainable duty cycle over a moving integration window based at least in part on an MPE limit; and receive, from the base station, scheduling information based at least in part on the information related to the power headroom at the current power level and the information related to the sustainable duty cycle over the moving integration window.

In some aspects, a non-transitory computer-readable medium may store one or more instructions for wireless communication. The one or more instructions, when executed by one or more processors of a base station, may cause the one or more processors to: receive, from a UE, a report that includes information related to a power headroom at the UE and information related to a sustainable duty cycle for the UE over a moving integration window based at least in part on an MPE limit; and transmit, to the UE, scheduling information based at least in part on the information related to the power headroom at the UE and the information related to the sustainable duty cycle for the UE over the moving integration window.

In some aspects, an apparatus for wireless communication may include: means for transmitting, to a base station, a report that includes information related to a power headroom at a current power level and information related to a sustainable duty cycle over a moving integration window based at least in part on an MPE limit; and means for receiving, from the base station, scheduling information based at least in part on the information related to the power headroom at the current power level and the information related to the sustainable duty cycle over the moving integration window.

In some aspects, an apparatus for wireless communication may include: means for receiving, from a UE, a report that includes information related to a power headroom at the UE and information related to a sustainable duty cycle for the UE over a moving integration window based at least in part on an MPE limit; and means for transmitting, to the UE, scheduling information based at least in part on the information related to the power headroom at the UE and the information related to the sustainable duty cycle for the UE over the moving integration window.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
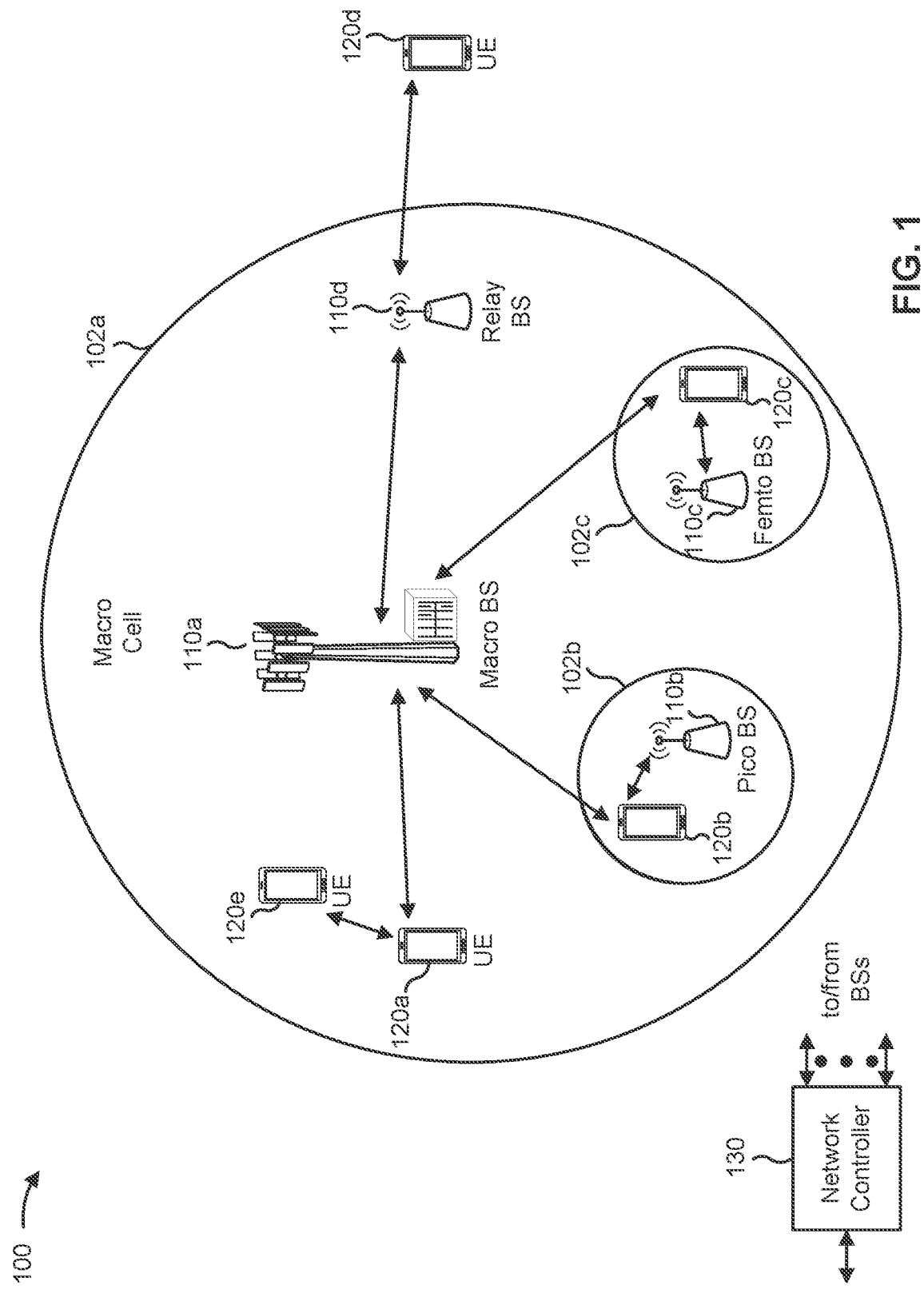
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
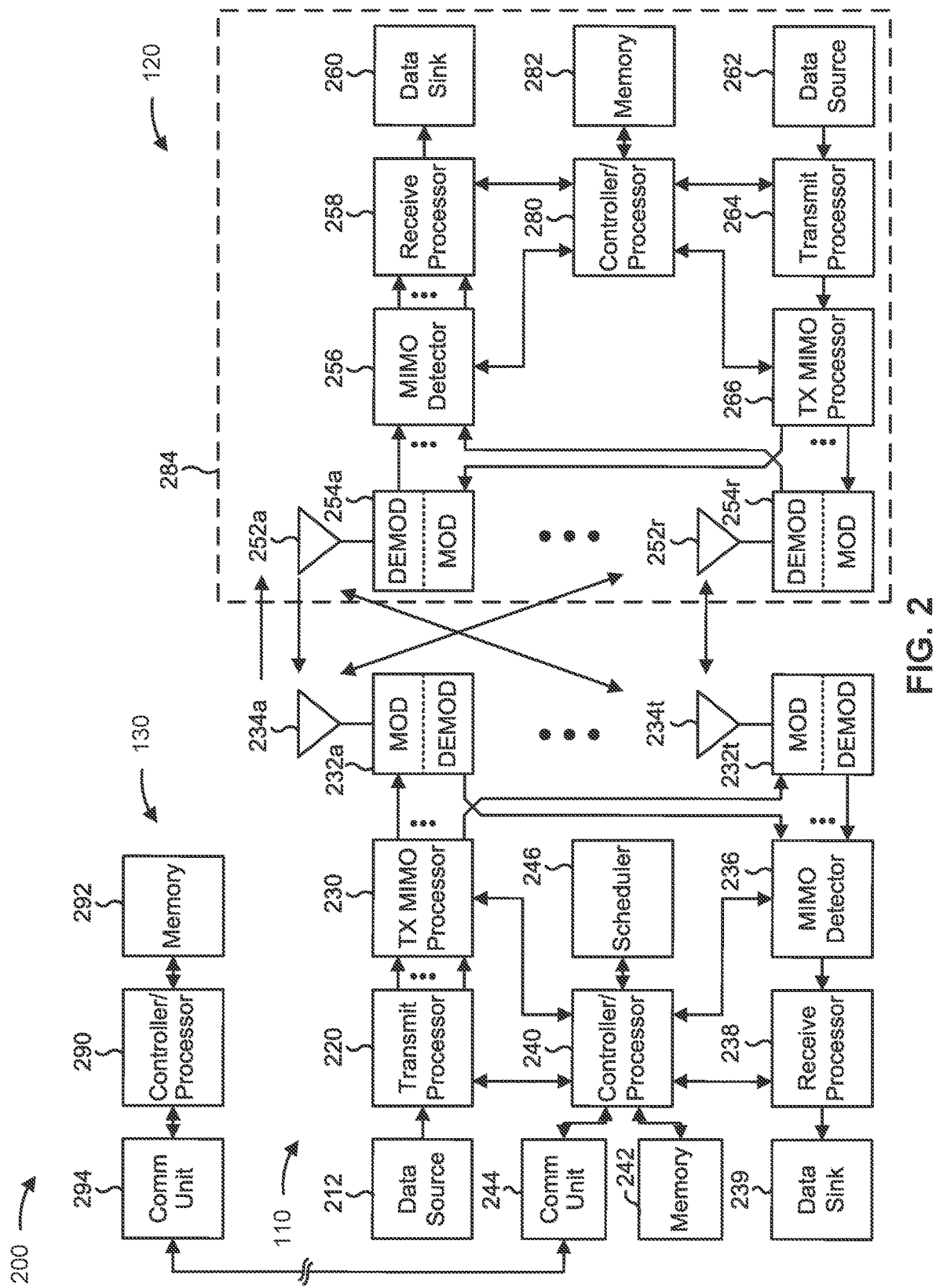
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with maximum permissible exposure (MPE) mitigation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, UE 120 may include means for transmitting, to base station 110, a report that includes information related to a power headroom at a current power level and information related to a sustainable duty cycle over a moving integration window based at least in part on a maximum permissible exposure limit, means for receiving, from base station 110, scheduling information based at least in part on the information related to the power headroom at the current power level and the information related to the sustainable duty cycle over the moving integration window, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, a report that includes information related to a power headroom at UE 120 and information related to a sustainable duty cycle for UE 120 over a moving integration window based at least in part on a maximum permissible exposure limit, means for transmitting, to UE 120, scheduling information based at least in part on the information related to the power headroom at UE 120 and the information related to the sustainable duty cycle for UE 120 over the moving integration window, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
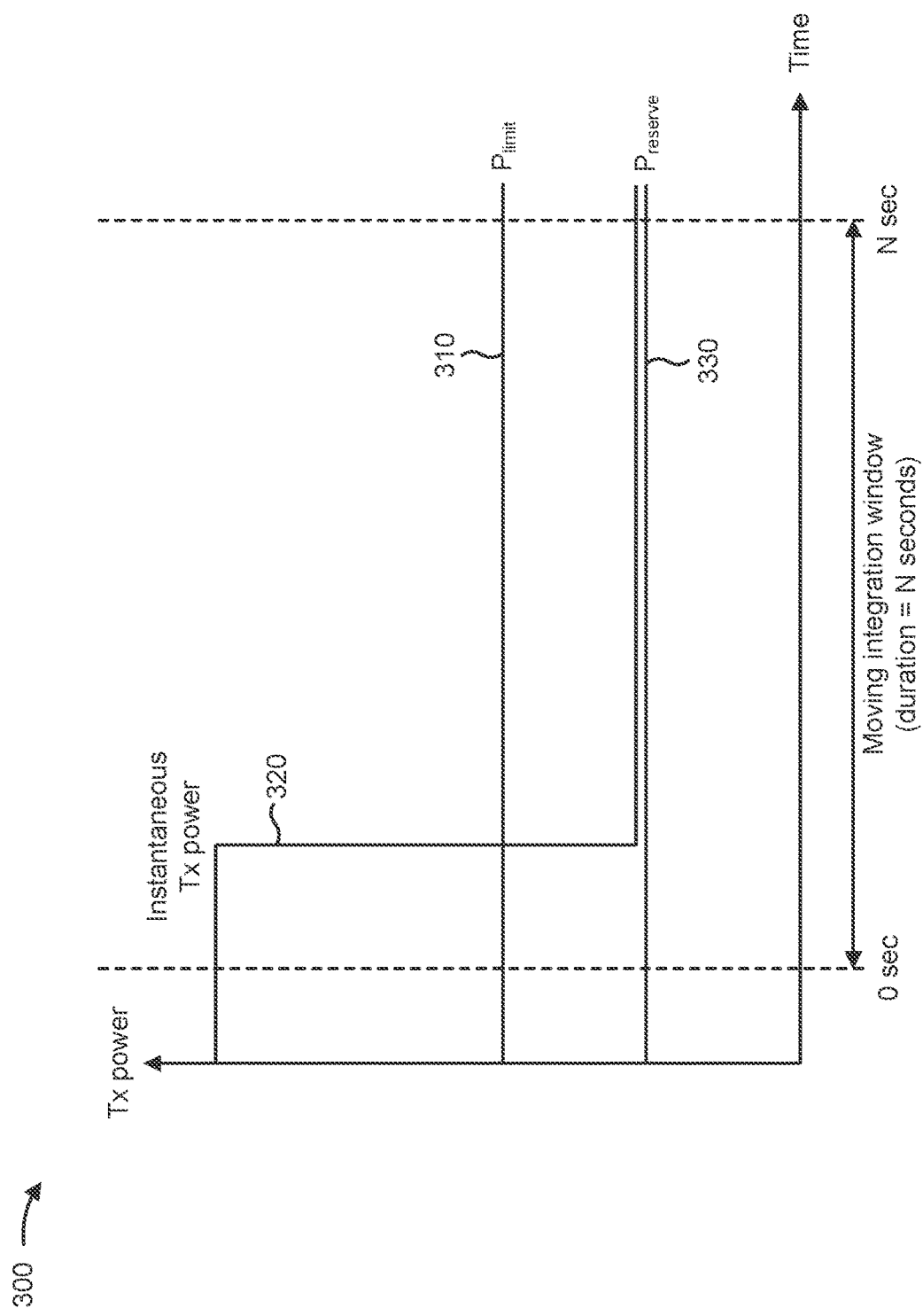
FIG. 3 is a diagram illustrating an example of a UE adapting transmit power over a moving integration window to satisfy a maximum permissible exposure (MPE) limit, in accordance with various aspects of the present disclosure.

FIG. 3 is a diagram illustrating an example 300 of a UE adapting transmit power over a moving integration window to satisfy a maximum permissible exposure (MPE) limit, in accordance with various aspects of the present disclosure.

Because UEs may emit radio frequency (RF) waves, microwaves, and/or other radiation, UEs are generally subject to regulatory RF safety requirements that set forth specific guidelines, or MPE limits, that constrain various operations that the UEs can perform. For example, RF emissions may generally increase when a UE is transmitting, and the RF emissions may further increase in cases where the UE is performing frequent transmissions, high-power transmissions, and/or the like. Accordingly, because frequent and/or high-power transmission may lead to significant RF emissions, regulatory agencies (e.g., the Federal Communications Commission (FCC) in the United States) may provide information related to acceptable RF radiation exposure when UEs are communicating using different radio access technologies.

For example, when a UE is communicating using radio access technologies that operate in a frequency range below 6 GHz, the applicable RF exposure parameter is a specific absorption rate (SAR), which refers to a rate at which the human body absorbs energy when exposed to RF energy (e.g., power absorbed per unit of mass, which may be expressed according to watts per kilogram (W/kg)). In particular, SAR requirements generally specify that overall radiated power by a UE is to remain under a certain level to limit heating that may occur when RF energy is absorbed. In another example, when a UE is communicating using a radio access technology that operates in a high frequency range, such as a millimeter wave (mmW) frequency range, the applicable RF exposure parameter is power density, which may be regulated to limit heating of the UE and/or nearby surfaces.

Accordingly, UEs generally have to satisfy MPE limits, which are typically regulatory requirements that are defined in terms of aggregate exposure over a certain amount of time, and the aggregate exposure may be averaged over a moving integration window (or moving time window). For example, as shown in FIG. 3, and by reference number 310, a UE may be subject to an average power limit (Pima) that corresponds to an average power at which an MPE limit is satisfied if the UE were to transmit substantially continuously over a moving integration window of N seconds (e.g., 100 seconds). Accordingly, as shown by reference number 320, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window and then reduce the instantaneous transmit power until the moving integration window ends in order to ensure that the MPE limit on aggregate exposure is satisfied over the entire moving integration window. In general, as shown by reference number 330, the UE may reduce the instantaneous transmit power to a reserve power level ($P_{reserve}$), which is a minimum transmit power level to maintain a link with a base station.

However, in some cases, a UE may be operating in a wireless network that uses time division duplexing (TDD), which are often downlink-centric. Accordingly, because a UE is unlikely to be scheduled to perform continuous transmissions, reducing the instantaneous transmit power based on the worst-case scenario may potentially lead to degraded uplink performance. For example, if the UE has to take a larger than necessary power backoff based on the (likely incorrect) assumption that the UE will continuously transmit over the moving integration window, the large power backoff may reduce performance for uplink transmissions and cause an uplink connection to be dropped. Furthermore, because a base station in communication with the UE may be unaware of how much remaining energy budget is available to the UE within the moving integration window, the base station cannot take appropriate action to adapt scheduling to help the UE maintain the uplink connection.

Some aspects described herein relate to techniques and apparatuses to provide, to a base station, a report that includes information related to a power headroom available to a UE at a current power level and information related to a duty cycle that the UE can sustain over a moving integration window and/or a remaining energy budget that the UE has over the moving integration window. Accordingly, the base station may use the information contained in the report to dynamically adapt scheduling for the UE to help the UE maintain the uplink connection, satisfy MPE limits, and/or the like. For example, in some aspects, the base station may schedule the UE to transmit less often, modify uplink grants to reduce uplink transmit power (e.g., by scheduling a narrower uplink bandwidth or a lower modulation order), and/or the like if the report indicates that the UE has a low energy budget. In another example, the base station may schedule the UE to transmit more often, modify uplink grants to increase uplink transmit power (e.g., by scheduling a wider uplink bandwidth or a higher modulation order), and/or the like to increase performance if the report indicates that the UE has a low energy budget. In this way, by providing a UE report to the base station that indicates the uplink energy budget available to the UE, the base station may schedule the UE more efficiently, which improves performances, conserves network resources that may otherwise be wasted reestablishing a connection that was dropped because the UE reduced the uplink transmit power more than necessary, and/or the like.

Figure 4:
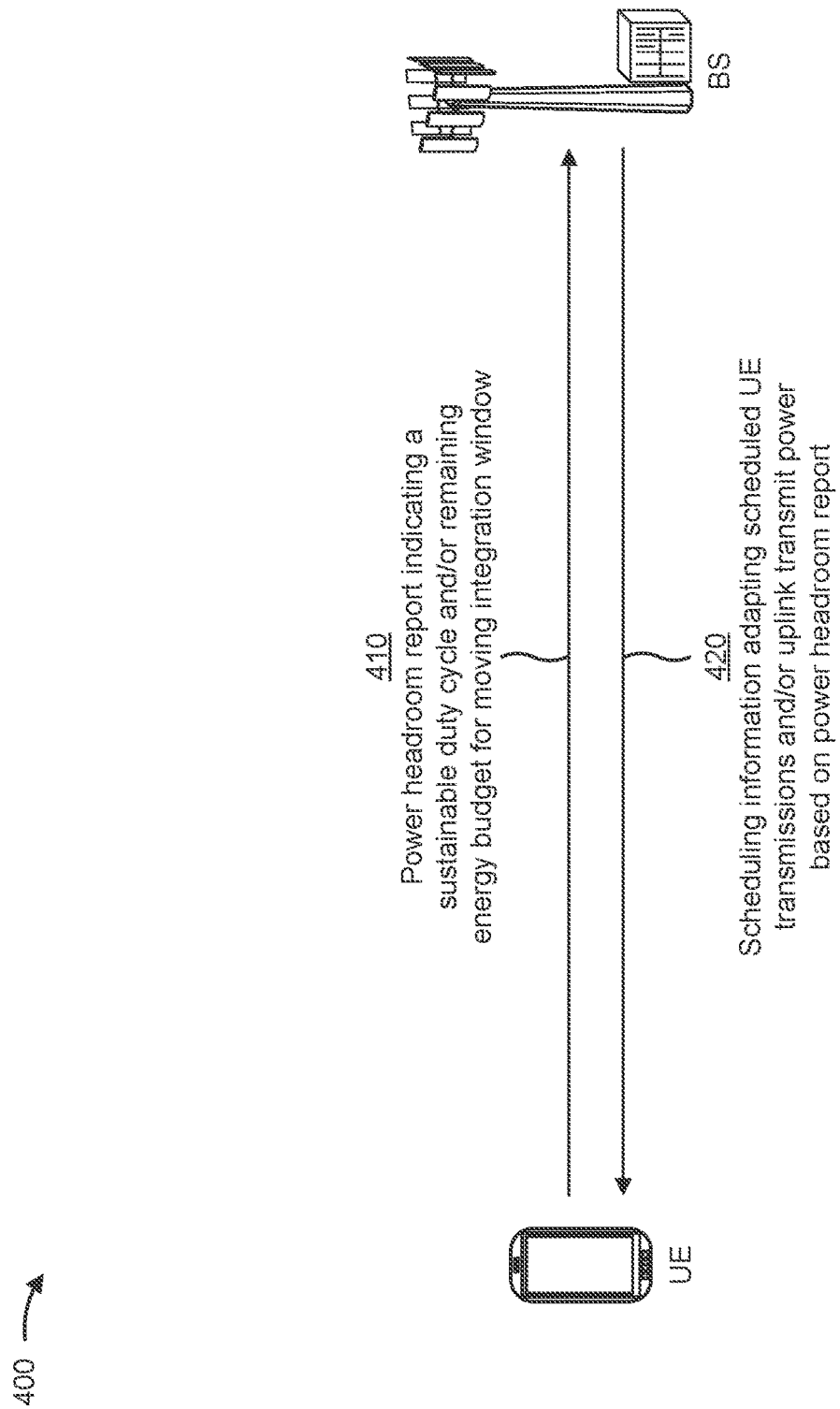
FIG. 4 is a diagram illustrating an example of UE reporting for MPE mitigation, in accordance with various aspects of the present disclosure.

FIG. 4 is a diagram illustrating an example 400 of UE reporting for MPE mitigation, in accordance with various aspects of the present disclosure. As shown in FIG. 4, example 400 includes a UE in communication with a base station. As described herein, in some cases, the UE may be a "simple" UE that has a preconfigured maximum transmit power and duty cycle to always satisfy an MPE limit. For example, the preconfigured maximum transmit power for the simple UE may be set to Pima, which is the average power at which the MPE limit is satisfied, and the simple UE may be configured with an assumption on how often transmissions occur (e.g., a 25% duty cycle). Alternatively, in some cases, the UE may be a "smart" UE that can dynamically adapt a transmit power and/or duty cycle to satisfy an MPE limit within a moving integration window. For example, as described in further detail above, the smart UE may transmit at a high power that exceeds Pima for a portion of the moving integration window and subsequently reduce the transmit power, duty cycle, and/or the like to ensure that the average power over the entire integration window is below Pima.

As shown in FIG. 4, and by reference number 410, the UE may transmit, and the base station may receive, a power headroom report that indicates a duty cycle that the UE can sustain over a moving integration window and/or a remaining energy budget that is available to the UE over the moving integration window. In some aspects, the UE may transmit the power headroom report to the base station on a periodic basis, or the UE may transmit the power headroom report to the base station based at least in part on determining that one or more conditions are satisfied. For example, in some aspects, the power headroom report may be transmitted when a value of and/or a change in power headroom available at the UE satisfies a threshold value, when a value of and/or a change in one or more power reductions in effect at the UE satisfies a threshold value, when a value of and/or a change in the sustainable duty cycle satisfies a threshold value, when a value of and/or a change in the remaining energy budget satisfies a threshold value, based on a request from the base station, and/or the like.

In some aspects, the UE may track how much energy has been radiated during the moving integration window and dynamically adapt the transmit power (e.g., by using a lower transmit power for each transmission), a transmit duty cycle (e.g., by transmitting less often), and/or the like to ensure that emission limits are satisfied based on a remaining energy budget until the end of the integration window. For example, the UE may be configured to reduce a transmit power to satisfy regulatory requirements by applying a power management maximum power reduction (P-MPR), which can have any suitable value to allow the UE to backoff transmit power to a level that may ensure compliance with the applicable regulatory requirements. Accordingly, the UE may generally have a capability to determine a power headroom at a current power level based at least in part on a currently available power budget, a P-MPR that is currently in effect at the UE to satisfy an MPE limit, a duty cycle that the UE can sustain over a remainder of the moving integration window while satisfying the MPE limit, an energy budget available for the remainder of the moving integration window, and/or the like.

Accordingly, in some aspects, the power headroom report transmitted to the base station may generally indicate how much additional power the UE has available to allocate to future transmissions. For example, if a maximum transmit power for the UE is 23 dBm and the UE is transmitting at 10 dBm, the report may indicate that the UE has a power headroom of 13 dB. In this way, the base station may determine whether scheduling can be changed to increase transmit power at the UE. Furthermore, in some aspects, the report may indicate one or more power reductions in effect at the UE. For example, the power reductions may include a maximum power reduction (MPR), an additional MPR (A-MPR) that is added to the MPR to provide additional spectral emission control due to regulatory, deployment, or other constraints, the P-MPR in effect to satisfy the MPE limit, and/or the like. In this way, if the report indicates that the P-MPR in effect at the UE is greater than zero, the base station may know that the UE is applying a power backoff for the purposes of satisfying the MPE limit. In such cases, the power headroom indicated in the report may be zero, as the UE will not have additional power available to allocate to future transmissions if the UE is already applying a power reduction to satisfy the MPE limit. Furthermore, in some aspects, the power headroom report may further include information related to a duty cycle that the UE can sustain at the current transmit power level over the remainder of the moving integration window and still satisfy the MPE limit, an amount of energy budget that the UE has available for the remainder of the moving integration window, and/or the like.

In some aspects, in cases where the power headroom report includes information related to the duty cycle that the UE can sustain over the remainder of the moving integration window, the power headroom may be reported relative to a maximum configured power ($P_{cmax}$) for the UE and the P-MPR that the UE would apply for the reported duty cycle. For example, the maximum configured power may generally be defined as a difference between a maximum output power for a power class ($P_{powerclass}$) associated with the UE (e.g., +23 dBm for a class 3 device) and a sum of all power reductions in effect at the UE (e.g., a sum of an MPR, A-MPR, and/or P-MPR). In some aspects, the UE may calculate the maximum configured power as if the P-MPR value configured for the UE were already applied even in cases where the P-MPR value has not been applied (e.g., when the power headroom is greater than zero).

Accordingly, in the power headroom report transmitted to the base station, the reported power headroom may correspond to a difference between an actual transmit power at which the UE is operating and the maximum configured power, $P_{cmax}$. Furthermore, the sustainable duty cycle that the UE indicates in the report may be determined based on a current transmit power level associated with the reported power headroom, or the sustainable duty cycle indicated in the report may be based on an assumption that the current transmit power is increased to a level that exhausts the power headroom (e.g., a power level at which the power headroom is reduced to zero, which may be the maximum power that the UE can use to transmit for a given beam).

In some aspects, when the UE is a smart UE that can dynamically adapt a transmit power and/or duty cycle to satisfy the MPE limit within the moving integration window, the smart UE may report a power headroom value, a sustainable duty cycle value, a remaining energy budget, and/or the like according to a current status in the moving integration window. Furthermore, when the current transmit power level at the smart UE is reduced to Preserve, which is the minimum transmit power level to maintain a link with the base station, the UE may be applying the maximum P-MPR available to the UE (e.g., because the transmit power level has been reduced to the minimum transmit power level needed to maintain the link with the base station). In such cases, the UE may report the maximum P-MPR value applied at the UE and further report updated information related to the duty cycle that the UE can sustain over the remainder of the moving integration window, the energy budget available to the UE over the remainder of the moving integration window, and/or the like. In some aspects, the value of $P_{reserve}$ may be a static parameter that has a fixed value, which may be specific to the UE (e.g., based on an antenna configuration and/or other design parameters associated with the UE). Additionally, or alternatively, the UE may dynamically modify the value of $P_{reserve}$ and the sustainable duty cycle paired with the value of $P_{reserve}$ based on an internal algorithm. Alternatively, when the UE is a simple UE that has a preconfigured maximum transmit power and duty cycle to always satisfy the MPE limit, the simple UE may report the P-MPR (if any) in effect at the simple UE and the duty cycle that the simple UE has a capability to sustain, as the simple UE may have a fixed duty cycle that does not change adaptively.

In some aspects, when reporting the sustainable duty cycle, the duty cycle may be quantized as a bit sequence that includes multiple bits to indicate one of multiple duty cycle values in a range that has a greater granularity at a lower end of the range. For example, in some aspects, a three-bit field may be used to indicate one of eight possible duty cycle values, which may include duty cycles of 100%, 50%, 30%, 25%, 20%, 15%, and 10%, with an additional value reserved for future extensions. For example, a 100% duty cycle may generally mean that the UE does not have any issues with satisfying the MPE limit at the current transmit power level (e.g., the UE can sustain substantially continuous transmissions at the current transmit power level over the remainder of the moving integration window without exceeding the MPE limit). In contrast, a low duty cycle (e.g., 10%) may mean that the UE is at risk of exceeding the MPE limit unless transmissions are scheduled less often. In other examples, a four-bit field may be used to indicate one of sixteen possible duty cycles to provide more granularity in the sustainable duty cycle indicated in the report, and/or the like. In general, greater granularity may be provided at the lower end of the range because the UE is more likely to operate at duty cycles in the lower end of the range (e.g., in downlink-centric wireless networks). Furthermore, greater granularity may be provided at the lower end of the range because the UE is more likely to experience issues with maintaining the link with the base station at lower duty cycles.

Similarly, when reporting the remaining energy budget, the remaining energy budget may be quantized as a bit sequence that includes multiple bits to indicate one of multiple energy budget values in a range that has a greater granularity at a lower end of the range (e.g., from 0 to 1, where 0 means that the UE has no energy budget remaining and can only transmit with a full P-MPR in effect, and where 1 means that the UE has a large energy budget and has no issues with satisfying the MPE limit). In some aspects, the bit sequence may include a three-bit field to indicate one of eight possible energy budget values, which may include energy budgets of 1, 0.50, 0.30, 0.25, 0.20, 0.15, and 0.10, with an additional value reserved for future extensions. In other examples, additional bits may be used to provide more granularity within the range. In general, as with the sustainable duty cycle, greater granularity may be provided at the lower end of the range because the UE is more likely to experience issues maintaining the link with the base station when most of the energy budget has been consumed.

In some aspects, when reporting the sustainable duty cycle, the UE may report values of the P-MPR and/or the sustainable duty cycle that depend on each other. For example, when the power headroom available at the UE is greater than zero, the value of P-MPR may be zero and the UE may have a sustainable duty cycle of 100%. Additionally, or alternatively, when the power headroom available at the UE reaches zero, meaning that the UE cannot increase the uplink transmit power, the UE may have to apply a non-zero P-MPR to satisfy the MPE limit and reduce the duty cycle accordingly. For example, the MPE limit generally corresponds to a fixed energy budget, which is based on an average transmit power over time. Accordingly, if the UE increases transmit power for a given time period, the UE may reduce the transmit duty cycle to satisfy the fixed energy budget limit over the given time period. Similarly, if the UE decreases transmit power for a given time period, the UE may increase the transmit duty cycle without exceeding the fixed energy budget.

As further shown in FIG. 4, and by reference number 420, the base station may transmit, and the UE may receive, scheduling information adapting scheduled transmissions for the UE, adapting uplink transmit power for the UE, and/or the like based at least in part on the power headroom report. For example, in some aspects, the base station may schedule uplink transmissions by the UE less often, modify uplink grants to reduce uplink transmit power for the UE (e.g., by scheduling a narrower uplink bandwidth and/or a lower modulation order), and/or the like when the power headroom report indicates that the UE can sustain only a low duty cycle, that the UE is running out of energy budget, and/or the like. In other cases, when the power headroom report indicates that the UE can sustain a high duty cycle and/or has a large energy budget available over the remainder of the moving integration window, the base station may schedule uplink transmissions by the UE more often, modify uplink grants to increase uplink transmit power for the UE (e.g., by scheduling a wider uplink bandwidth and/or a higher modulation order), and/or the like. In some aspects, the base station may generally adapt the scheduling information for the UE gradually to avoid causing issues that may lead to non-compliance with the MPE limit. For example, a sudden increase in the transmit power and/or duty cycle for the UE may lead to a sudden decrease in the remaining energy budget available to the UE. Accordingly, the scheduling information may be adapted gradually to ensure that further power headroom reports will be triggered if the adapted scheduling information is causing the UE to run out of energy budget or otherwise risk exceeding the MPE limit. In this way, the base station may take action to mitigate the risk of the UE exceeding the MPE limit if the adapted scheduling information triggers another power headroom report in which the UE is reporting a lower power headroom, a higher P-MPR value, a reduction in the duty cycle that the UE can sustain over the moving integration window, a reduction in the energy budget available to the UE, and/or the like.

In some aspects, to determine the scheduling information based on the power headroom report, the base station may monitor power headroom reports from the UE over time to observe how the power headroom, P-MPR values, sustainable duty cycle values, energy budget values, and/or the like are changing over time. For example, when the power headroom reports indicate a reduction in the sustainable duty cycle, the base station may adapt scheduling for the UE that reduces the duty cycle for the UE to the sustainable duty cycle (or less). For example, the base station may schedule fewer uplink transmissions for the UE to reduce the duty cycle for the UE.

Additionally, or alternatively, in some aspects, the base station may determine the scheduling information for the UE based on whether the UE is a simple UE that has a fixed maximum transmit power and a fixed duty cycle or a smart UE that has a capability to adapt a transmit power and/or duty cycle. For example, in cases where the UE is a smart UE, the base station may increase or decrease the duty cycle for the UE to improve uplink performance for the UE. In contrast, in cases where the UE is a simple UE that has a hard power limit, the base station may schedule the simple UE less often but even in such cases the simple UE will not have a capability to increase transmit power per transmission above the hard power limit. Accordingly, if the base station can determine that the UE is a smart UE, the base station may reduce the duty cycle to a level where the smart UE still has enough power per transmission to maintain the link with the base station.

In some aspects, the base station may therefore determine whether the UE providing the power headroom report is a simple UE or a smart UE and determine the scheduling information for the UE accordingly. For example, the base station may implicitly differentiate simple UEs from smart UEs because simple UEs may always report a duty cycle below 100% even if the UE has a power headroom greater than zero, whereas smart UEs may report a duty cycle of 100% if the UE has a power headroom greater than zero. Accordingly, in one technique, the base station may implicitly determine that the UE is a simple UE if the report indicates a power headroom greater than zero and a duty cycle below 100%, a power headroom greater than zero and an energy budget of 0, and/or the like. In another technique, the power headroom report may include an explicit indicator as to whether the UE is a simple UE with a fixed maximum transmit power and duty cycle or a smart UE with an adaptable transmit power and/or duty cycle, and the base station may make scheduling decisions for the UE according to the explicit indicator.

As indicated above, FIG. 4 is provided as an example. Other examples may differ from what is described with respect to FIG. 4.

Figure 5:
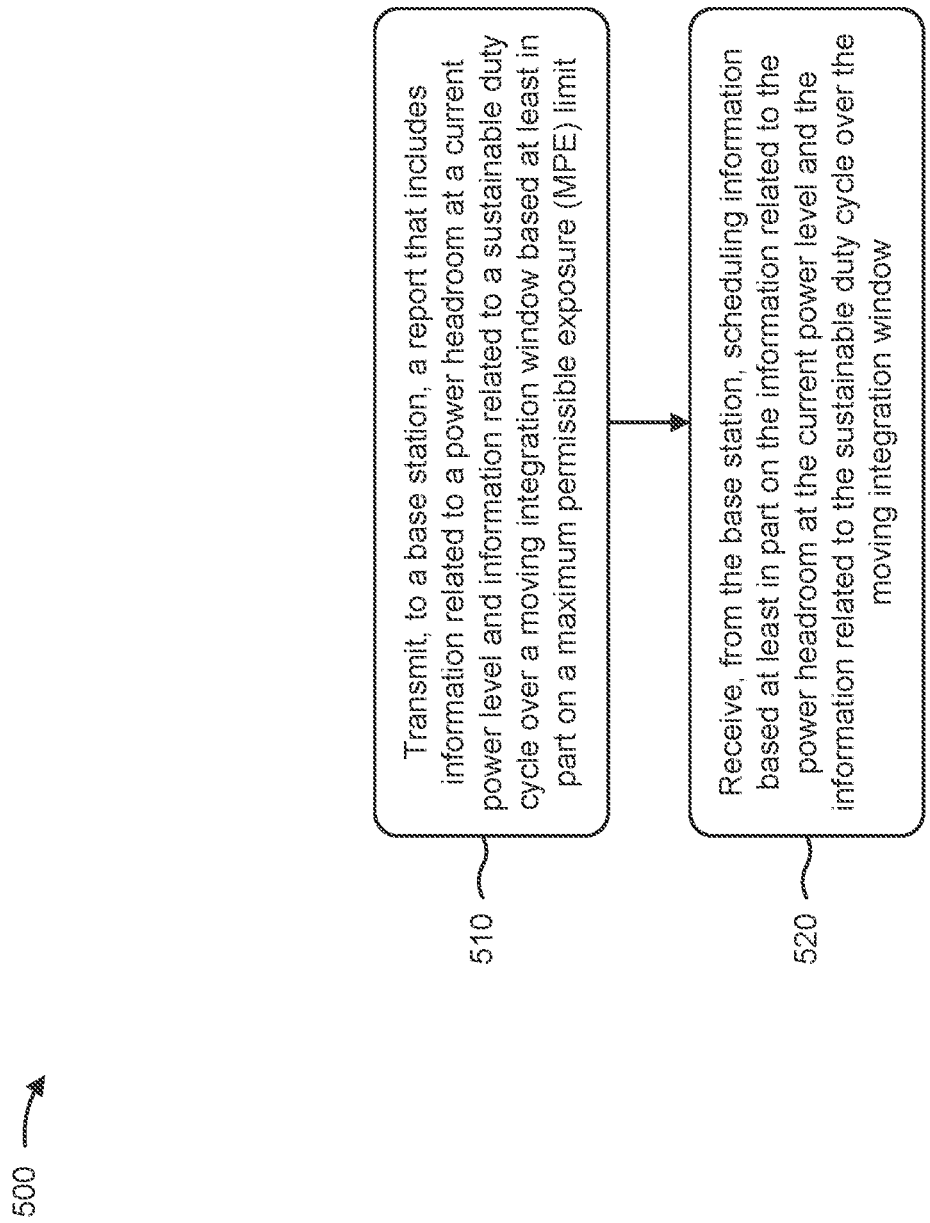
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with MPE mitigation.

As shown in FIG. 5, in some aspects, process 500 may include transmitting, to a base station, a report that includes information related to a power headroom at a current power level and information related to a sustainable duty cycle over a moving integration window based at least in part on an MPE limit (block 510). For example, the UE may transmit (e.g., using controller/processor 280, transmit processor 264, TX MIMO processor 266, MOD 254, antenna 252, and/or the like), to a base station, a report that includes information related to a power headroom at a current power level and information related to a sustainable duty cycle over a moving integration window based at least in part on an MPE limit, as described above.

As further shown in FIG. 5, in some aspects, process 500 may include receiving, from the base station, scheduling information based at least in part on the information related to the power headroom at the current power level and the information related to the sustainable duty cycle over the moving integration window (block 520). For example, the UE may receive (e.g., using antenna 252, DEMOD 254, MIMO detector 256, receive processor 258, controller/processor 280, and/or the like), from the base station, scheduling information based at least in part on the information related to the power headroom at the current power level and the information related to the sustainable duty cycle over the moving integration window, as described above.

Process 500 may include additional aspects, such as any single aspect or any combination of aspects described below and/or in connection with one or more other processes described elsewhere herein.

In a first aspect, the report further includes information related to one or more power reductions in effect at the UE.

In a second aspect, alone or in combination with the first aspect, process 500 further includes determining a maximum configured power based at least in part on a maximum output power associated with the UE and the one or more power reductions in effect at the UE, and the power headroom at the current power level is based at least in part on a difference between the current power level and the maximum configured power.

In a third aspect, alone or in combination with one or more of the first and second aspects, the sustainable duty cycle is based at least in part on one or more of the current power level or a maximum power level at which the UE is able to transmit to exhaust the power headroom at the current power level.

In a fourth aspect, alone or in combination with one or more of the first through third aspects, the power headroom at the current power level and the sustainable duty cycle over the moving integration window are based at least in part on one or more of a maximum power limit or a maximum transmission duty cycle adapted to satisfy the MPE limit within the moving integration window.

In a fifth aspect, alone or in combination with one or more of the first through fourth aspects, one or more of the maximum power limit or the maximum transmission duty cycle is adapted based at least in part on a reserve power level that defines a minimum power level to maintain a link with the base station.

In a sixth aspect, alone or in combination with one or more of the first through fifth aspects, the power headroom at the current power level and the sustainable duty cycle over the moving integration window are based at least in part on a fixed maximum power limit and a fixed maximum transmission duty cycle that are configured for the UE to satisfy the MPE limit.

In a seventh aspect, alone or in combination with one or more of the first through sixth aspects, the information related to the sustainable duty cycle includes a bit sequence including multiple bits to indicate one of multiple duty cycle values in a range having a greater granularity at a lower end of the range.

In an eighth aspect, alone or in combination with one or more of the first through seventh aspects, the report further includes information related to a remaining energy budget within the moving integration window based at least in part on the MPE limit.

In a ninth aspect, alone or in combination with one or more of the first through eighth aspects, the report is transmitted based at least in part on a change in one or more of the power headroom, the sustainable duty cycle, or the remaining energy budget satisfying a threshold value.

In a tenth aspect, alone or in combination with one or more of the first through ninth aspects, the information related to the remaining energy budget includes a bit sequence including multiple bits to indicate one of multiple energy budget values in a range having a greater granularity at a lower end of the range.

In an eleventh aspect, alone or in combination with one or more of the first through tenth aspects, the scheduling information includes one or more of an adapted quantity of scheduled transmissions or an adapted transmit power for the UE in the moving integration window.

In a twelfth aspect, alone or in combination with one or more of the first through eleventh aspects, the MPE limit is based at least in part on one or more of an SAR for transmissions via a first radio access technology or a power density for transmissions via a second radio access technology.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
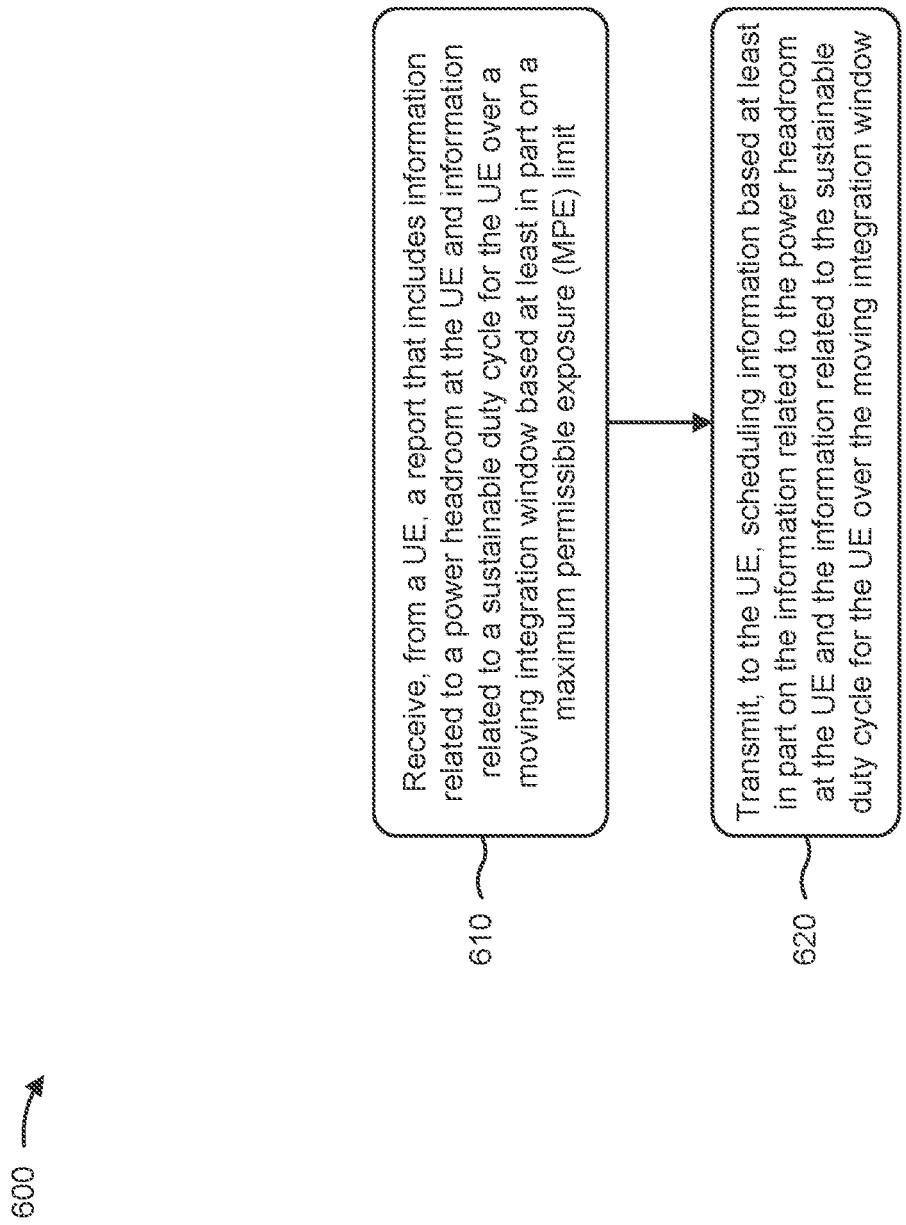
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110 and/or the like) performs operations associated with MPE mitigation based on UE reporting.

As shown in FIG. 6, in some aspects, process 600 may include receiving, from a UE, a report that includes information related to a power headroom at the UE and information related to a sustainable duty cycle for the UE over a moving integration window based at least in part on an MPE limit (block 610). For example, the base station may receive (e.g., using antenna 234, DEMOD 232, MIMO detector 236, receive processor 238, controller/processor 240, and/or the like), from a UE, a report that includes information related to a power headroom at the UE and information related to a sustainable duty cycle for the UE over a moving integration window based at least in part on an MPE limit, as described above.

As further shown in FIG. 6, in some aspects, process 600 may include transmitting, to the UE, scheduling information based at least in part on the information related to the power headroom at the UE and the information related to the sustainable duty cycle for the UE over the moving integration window (block 620). For example, the base station may transmit (e.g., using controller/processor 240, transmit processor 220, TX MIMO processor 230, MOD 232, antenna 234, and/or the like), to the UE, scheduling information based at least in part on the information related to the power headroom at the UE and the information related to the sustainable duty cycle for the UE over the moving integration window, as described above.

Process 600 may include additional aspects, such as any single aspect or any combination of aspects described below and/or in connection with one or more other processes described elsewhere herein.

In a first aspect, the report further includes information related to one or more power reductions in effect at the UE.

In a second aspect, alone or in combination with the first aspect, the power headroom at the UE is based at least in part on a difference between a current power level in effect at the UE and a maximum configured power for the UE that is based at least in part on a maximum output power associated with the UE and the one or more power reductions in effect at the UE.

In a third aspect, alone or in combination with one or more of the first and second aspects, the sustainable duty cycle is based at least in part on one or more of a current power level in effect at the UE or a maximum power level at which the UE is able to transmit to exhaust the power headroom at the UE.

In a fourth aspect, alone or in combination with one or more of the first through third aspects, the power headroom at the UE and the sustainable duty cycle over the moving integration window are based at least in part on one or more of a maximum power limit or a maximum transmission duty cycle adapted by the UE to satisfy the MPE limit within the moving integration window.

In a fifth aspect, alone or in combination with one or more of the first through fourth aspects, one or more of the maximum power limit or the maximum transmission duty cycle is adapted by the UE based at least in part on a reserve power level that defines a minimum power level to maintain a link with between the UE and the base station.

In a sixth aspect, alone or in combination with one or more of the first through fifth aspects, the power headroom at the UE and the sustainable duty cycle over the moving integration window are based at least in part on a fixed maximum power limit and a fixed maximum transmission duty cycle that are configured for the UE to satisfy the MPE limit.

In a seventh aspect, alone or in combination with one or more of the first through sixth aspects, the information related to the sustainable duty cycle includes a bit sequence including multiple bits to indicate one of multiple duty cycle values in a range having a greater granularity at a lower end of the range.

In an eighth aspect, alone or in combination with one or more of the first through seventh aspects, the report further includes information related to a remaining energy budget available at the UE within the moving integration window based at least in part on the MPE limit.

In a ninth aspect, alone or in combination with one or more of the first through eighth aspects, the report is received based at least in part on a change in one or more of the power headroom, the sustainable duty cycle, or the remaining energy budget satisfying a threshold value.

In a tenth aspect, alone or in combination with one or more of the first through ninth aspects, the information related to the remaining energy budget includes a bit sequence including multiple bits to indicate one of multiple energy budget values in a range having a greater granularity at a lower end of the range.

In an eleventh aspect, alone or in combination with one or more of the first through tenth aspects, the scheduling information includes one or more of an adapted quantity of scheduled transmissions or an adapted transmit power for the UE in the moving integration window.

In a twelfth aspect, alone or in combination with one or more of the first through eleventh aspects, the MPE limit is based at least in part on one or more of an SAR for transmissions via a first radio access technology or a power density for transmissions via a second radio access technology.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, a report that includes information related to a power headroom at a current power level and information related to a sustainable duty cycle over a moving integration window based at least in part on a maximum permissible exposure (MPE) limit; and
   receiving, from the base station, scheduling information based at least in part on the information related to the power headroom at the current power level and the information related to the sustainable duty cycle over the moving integration window.

2. The method of claim 1, wherein the report further includes information related to one or more power reductions in effect at the UE.

3. The method of claim 2, further comprising:
   determining a maximum configured power based at least in part on a maximum output power associated with the UE and the one or more power reductions in effect at the UE, wherein the power headroom at the current power level is based at least in part on a difference between the current power level and the maximum configured power.

4. The method of claim 1, wherein the sustainable duty cycle is based at least in part on one or more of the current power level or a maximum power level at which the UE is able to transmit to exhaust the power headroom at the current power level.

5. The method of claim 1, wherein the power headroom at the current power level and the sustainable duty cycle over the moving integration window are based at least in part on one or more of a maximum power limit or a maximum transmission duty cycle adapted to satisfy the MPE limit within the moving integration window.

6. The method of claim 5, wherein one or more of the maximum power limit or the maximum transmission duty cycle is adapted based at least in part on a reserve power level that defines a minimum power level to maintain a link with the base station.

7. The method of claim 1, wherein the power headroom at the current power level and the sustainable duty cycle over the moving integration window are based at least in part on a fixed maximum power limit and a fixed maximum transmission duty cycle that are configured for the UE to satisfy the MPE limit.

8. The method of claim 1, wherein the information related to the sustainable duty cycle includes a bit sequence including multiple bits to indicate one of multiple duty cycle values in a range having a greater granularity at a lower end of the range.

9. The method of claim 1, wherein the report further includes information related to a remaining energy budget within the moving integration window based at least in part on the MPE limit.

10. The method of claim 9, wherein the report is transmitted based at least in part on a change in one or more of the power headroom, the sustainable duty cycle, or the remaining energy budget satisfying a threshold value.

11. The method of claim 9, wherein the information related to the remaining energy budget includes a bit sequence including multiple bits to indicate one of multiple energy budget values in a range having a greater granularity at a lower end of the range.

12. The method of claim 1, wherein the scheduling information includes one or more of an adapted quantity of scheduled transmissions or an adapted transmit power for the UE in the moving integration window.

13. The method of claim 1, wherein the MPE limit is based at least in part on one or more of a specific absorption rate for transmissions via a first radio access technology or a power density for transmissions via a second radio access technology.

14. A method of wireless communication performed by a base station, comprising:
  receiving, from a user equipment (UE), a report that includes information related to a power headroom at the UE and information related to a sustainable duty cycle for the UE over a moving integration window based at least in part on a maximum permissible exposure (MPE) limit; and
  transmitting, to the UE, scheduling information based at least in part on the information related to the power headroom at the UE and the information related to the sustainable duty cycle for the UE over the moving integration window.

15. The method of claim 14, wherein the report further includes information related to one or more power reductions in effect at the UE.

16. The method of claim 15, wherein the power headroom at the UE is based at least in part on a difference between a current power level in effect at the UE and a maximum configured power for the UE that is based at least in part on a maximum output power associated with the UE and the one or more power reductions in effect at the UE.

17. The method of claim 14, wherein the sustainable duty cycle is based at least in part on one or more of a current power level in effect at the UE or a maximum power level at which the UE is able to transmit to exhaust the power headroom at the UE.

18. The method of claim 14, wherein the power headroom at the UE and the sustainable duty cycle over the moving integration window are based at least in part on one or more of a maximum power limit or a maximum transmission duty cycle adapted by the UE to satisfy the MPE limit within the moving integration window.

19. The method of claim 18, wherein one or more of the maximum power limit or the maximum transmission duty cycle is adapted by the UE based at least in part on a reserve power level that defines a minimum power level to maintain a link with between the UE and the base station.

20. The method of claim 14, wherein the power headroom at the UE and the sustainable duty cycle over the moving integration window are based at least in part on a fixed maximum power limit and a fixed maximum transmission duty cycle that are configured for the UE to satisfy the MPE limit.

21. The method of claim 14, wherein the information related to the sustainable duty cycle includes a bit sequence including multiple bits to indicate one of multiple duty cycle values in a range having a greater granularity at a lower end of the range.

22. The method of claim 14, wherein the report further includes information related to a remaining energy budget available at the UE within the moving integration window based at least in part on the MPE limit.

23. The method of claim 22, wherein the report is received based at least in part on a change in one or more of the power headroom, the sustainable duty cycle, or the remaining energy budget satisfying a threshold value.

24. The method of claim 22, wherein the information related to the remaining energy budget includes a bit sequence including multiple bits to indicate one of multiple energy budget values in a range having a greater granularity at a lower end of the range.

25. The method of claim 14, wherein the scheduling information includes one or more of an adapted quantity of scheduled transmissions or an adapted transmit power for the UE in the moving integration window.

26. The method of claim 14, wherein the MPE limit is based at least in part on one or more of a specific absorption rate for transmissions via a first radio access technology or a power density for transmissions via a second radio access technology.

27. A user equipment (UE) for wireless communication, comprising:
  a memory; and
  one or more processors operatively coupled to the memory, the memory and the one or more processors configured to:
    transmit, to a base station, a report that includes information related to a power headroom at a current power level and information related to a sustainable duty cycle over a moving integration window based at least in part on a maximum permissible exposure (MPE) limit; and
    receive, from the base station, scheduling information based at least in part on the information related to the power headroom at the current power level and the information related to the sustainable duty cycle over the moving integration window.

28. The UE of claim 27, wherein the MPE limit is based at least in part on one or more of a specific absorption rate for transmissions via a first radio access technology or a power density for transmissions via a second radio access technology.

29. A base station for wireless communication, comprising:
  a memory; and
  one or more processors operatively coupled to the memory, the memory and the one or more processors configured to:

receive, from a user equipment (UE), a report that includes information related to a power headroom at the UE and information related to a sustainable duty cycle for the UE over a moving integration window based at least in part on a maximum permissible exposure (MPE) limit; and transmit, to the UE, scheduling information based at least in part on the information related to the power headroom at the UE and the information related to the sustainable duty cycle for the UE over the moving integration window.

30. The base station of claim 29, wherein the MPE limit is based at least in part on one or more of a specific absorption rate for transmissions via a first radio access technology or a power density for transmissions via a second radio access technology.

\* \* \* \* \*